United States Patent [19]

Parris

[11] Patent Number: 5,561,729
[45] Date of Patent: Oct. 1, 1996

[54] COMMUNICATIONS CABLE INCLUDING FIBER REINFORCED PLASTIC MATERIALS

[75] Inventor: Donald R. Parris, Hickory, N.C.

[73] Assignee: Siecor Corporation, Hickory, N.C.

[21] Appl. No.: 441,143

[22] Filed: May 15, 1995

[51] Int. Cl.$^6$ .................................................. G02B 6/44
[52] U.S. Cl. ........................ 385/113; 385/100; 385/109
[58] Field of Search .................................. 385/100, 107, 385/109, 112, 113, 141, 114; 174/70 R, 72 C, 96, 98, 110 R, 120 R, 121 R, 121 SR

[56] References Cited

U.S. PATENT DOCUMENTS

| | | | |
|---|---|---|---|
| 4,606,604 | 8/1986 | Soodak | 385/113 X |
| 4,693,551 | 9/1987 | Blanco et al. | 385/113 X |
| 4,743,085 | 5/1988 | Jenkins et al. | 385/113 X |
| 4,818,060 | 4/1989 | Arroyo | 385/113 X |
| 4,875,757 | 10/1989 | Greveling | 385/113 X |
| 4,883,622 | 11/1989 | Dealy et al. | 264/108 |
| 4,909,592 | 3/1990 | Arroyo et al. | 385/113 X |
| 4,956,039 | 9/1990 | Olesen et al. | 156/180 |
| 5,082,348 | 1/1992 | Gartside, III et al. | 385/111 |
| 5,101,467 | 3/1992 | Bernard | 385/112 |
| 5,148,509 | 9/1992 | Kannabiran | 385/109 |
| 5,307,843 | 5/1994 | Jarrin et al. | 138/174 |
| 5,320,788 | 6/1994 | Schneider et al. | 264/1.5 |
| 5,369,720 | 11/1994 | Parry et al. | 385/114 |

*Primary Examiner*—Brian Healy
*Attorney, Agent, or Firm*—J. David Abernethy

[57] ABSTRACT

Telecommunications cables include elements made of thermoplastic material which is reinforced by discontinuous reinforcement fibers made of materials such as glass. The reinforcement fibers each have a length of less than 0.2 cm and are incorporated in the thermoplastic material to reduce the coefficient of thermal expansion of the thermoplastic material. Tubes reinforced by the short reinforcement fibers have good flexibility. Such tubes are used as cable jackets and as buffer tubes carrying telecommunications elements in cables. The cables may also have strength members coated with a plastic material incorporating the reinforcement fibers.

19 Claims, 2 Drawing Sheets

COMMUNICATIONS CABLE INCLUDING FIBER REINFORCED PLASTIC MATERIALS

BACKGROUND OF THE INVENTION

This invention relates to telecommunication cables.

The specified tensile strength and operating temperature ranges of certain fiber optic cables are based upon the expected limits for longitudinal thermal expansion and contraction and the physical compression and tension to be experienced by the cable. The object is the avoidance of tension on or excessive bending of the optical fibers, which leads to attenuation of the transmitted signal or damage to the optical fibers. The cables also have a specified minimum bend radius. If the cables are bent more sharply than allowed by the minimum bend radius during installation, kinking may result, causing damage to the optical fibers, also known as light waveguides.

Thermoplastic polyolefin materials have many characteristics desirable for use in cables, as these materials are chemically resistant, hydrolytically stable, not environmentally harmful, easily processed, and low in cost. High coefficients of thermal expansion and high levels of shrinkback, defined below, are their principal limitations. Excessive shrinkage of tubes made of thermoplastic materials which are components of communications cables can lead to excessive compression on or excessive bending of the communication elements in those cables. Excessive thermal expansion of such tubes can lead to excessive tension being applied to the communication elements. Shrinkage and expansion of cable components made of these plastic materials are major factors to be considered in determining the operating temperature range of the cable.

Exact tube shrinkage control is critical in the extrusion of cable buffer tubes containing optical fibers. The amount of excess optical fiber length as compared to the length of the buffer tube substantially affects the amount of bending of the optical fibers at low temperatures to be experienced by the cables. Cables are sometimes designed to have an anticipated excess fiber length. Excessive tube shrinkage increases the excess fiber length, and may cause a cable to fail to perform according to its specification.

Control of shrinkage and expansion of cable outer jackets and central member jackets are also important because they typically contain a relatively large volume of plastic material. Therefore, relatively large forces can be exerted in the longitudinal direction on the other cable components.

It is known that cable components made of plastic materials shrink when changing from the liquid to the solid phase during processing. Plastics made of crystalline materials exhibit such shrinkage significantly more than plastics made of non-crystalline amorphous materials. Some contraction occurs immediately upon solidification. Further contraction occurs as the plastic cools to room temperature. Secondary crystallization occurs over longer periods of time thereafter, causing shrinkage that is sometimes referred to as "shrinkback", in the case of uncabled buffer tubes holding one or more optical fibers. Shrinkback is not a significant factor for jackets because other cable components inhibit such shrinkage, except possibly at the cable ends. Hereinafter the expression "post-extrusion shrinkage" is used to designate the combination of a portion of the contraction due to cooling of a solidified buffer tube holding an optical fiber, and the shrinkback that occurs within the subsequent seven days. The portion of the contraction due to cooling that is included in the term "post-extrusion shrinkage" is the contraction that occurs beyond that point in the extrusion line where the optical fibers and the buffer tube become coupled. Defined in this way, the post-extrusion shrinkage is numerically equal to the so-called excess fiber length in the buffer tube seven days after extrusion.

Environmentally induced thermal contraction and expansion as well as shrinkback in tubes has been controlled by coupling tubes to adjacent cable components that do not experience shrinkage, by the addition of non-crystalline materials to the extrudate, or by the addition of rigid filler materials, typically inorganic, that remain in the solid state during cable processing. The filler materials usually have surface treatments allowing them to couple sufficiently to the plastic materials, and the filler materials also must have sufficient compressive strength to control shrinkage of the tubes made of the plastic materials incorporating the filler materials.

In particular, embedding longitudinally oriented reinforcement fibers in a tube lowers the expansion or contraction of the tube during temperature changes because the plastic of the tube generally has a higher thermal coefficient of expansion than the reinforcement fibers. For a buffer tube, shrinkback is also reduced.

One disadvantage of the use of the above-mentioned filler materials is cost. Another is that their stiffness, though necessary for the filler materials to perform their intended function, causes the cable elements incorporating the filler materials to have too little flexibility. The composite materials have too low an elongation to break, causing them to be too brittle. In addition, the cable elements have an undesirably large diameter at kink.

U.S. Pat. No. 5,307,843 discloses an apparatus and method for extrusion of thermoplastic tubes reinforced by fibers of 1 cm in length of Kevlar, glass, carbon, boron or ceramics in a proportion of 5 to 40% by weight, particularly 20–30% by weight. The stated objects are to reduce the risk of rupture of a tube carrying a fluid due to longitudinal cracks and to improve the tube's surface smoothness. The process is stated to enable fibers to be directed perpendicularly to the axis of the tube. The problem of tube longitudinal dimensional stability is not addressed, as exact tube length is not critical for tubes carrying fluids.

U.S. Pat. No. 4,693,551 discloses polyethylene buffer tubes having embedded therein a plurality of glass fibers substantially oriented in the longitudinal direction along the tube. The stated object is to contribute to cable tensile strength. The reinforcement fibers have a length of about 0.5 cm. The volume of glass fibers in the tube material is up to 30%, preferably 25 to 30% by volume, estimated to equal 45% to 52% by weight. It is believed that such buffer tubes would be relatively stiff, and the problem of tube longitudinal dimensional stability is not addressed.

U.S. Pat. No. 4,956,039 discloses a core strength member coated by polypropylene filled with short E-glass fibers which are chemically coupled to the polypropylene. The exact length of the fibers is unstated. The degree of filling of the glass fibers is from 10% to 30%, a preferred value being 20%. However, a second layer of thermoplastic is also applied over the filled polypropylene layer to stiffen the end structure, to reduce the danger of kinking.

SUMMARY OF THE INVENTION

It is therefore an object of the present invention to provide telecommunications cables having improved performance at low and high temperatures.

Another object of the invention is to provide cables having tubes or coatings on strength members with such tubes or coatings made of thermoplastic materials, the longitudinal dimensional stability of such tubes or coatings being limited to acceptable levels, while yet avoiding causing the tubes or coatings to be too stiff and too brittle.

These and other objects are provided, according to the present invention, by a cable according to a first embodiment which includes at least one communications element and an extruded tube containing the at least one communications element, said tube being made of a thermoplastic polyolefin material having embedded therein reinforcement fibers each having a length of not more than 0.2 cm., in contrast to lengths of 0.5 cm or more as taught by the prior art. Tubes incorporating the reinforcement fibers having shorter lengths advantageously are relatively flexible as compared to tubes having reinforcement fibers of longer lengths. The length of the reinforcement fibers may be selected to be 0.1 cm or shorter, if desired.

The percent elongation to break of the tube incorporating the reinforcement fibers was found to be a function of the proportion by weight in the tube of the reinforcement fibers and the length of the reinforcement fibers. Therefore, the maximum proportion by weight in the tube of the reinforcement fibers and the length of the reinforcement fibers are chosen such that the reinforced tube has a relatively high percent elongation to break, 60% considered to be relatively high. The reinforcement fibers constitute a maximum proportion by weight of the reinforced tube of twenty-five percent.

For reinforcement fibers of a length of around 0.02 cm to around 0.06 cm, the preferred maximum proportion by weight of the reinforcement fibers was about twenty-five per cent, while for reinforcement fibers of a length of around 0.06 cm to around 0.1 cm, the maximum proportion by weight of the reinforcement fibers was about fifteen per cent as used in a particular polypropylene material tested.

A reinforced buffer tube according to the invention should preferably have a reduction of at least twenty percent in the percentage of tube longitudinal post-extrusion shrinkage after seven days, as compared with the percentage of tube longitudinal post-extrusion shrinkage after seven days of a tube having no reinforcement fibers incorporated in its plastic matrix material. Reinforced buffer tubes or reinforced jackets should have coefficients of thermal expansion which are at least five percent less than the coefficients of thermal expansion of the thermoplastic materials without such reinforcement fibers.

Reinforced tubes according to the invention may serve in a cable as a buffer tube holding at least one communications element or as an outer tubular jacket of the cable. If desired, the reinforced tubes may also be used as intermediate tubes between the outer jacket and the buffer tubes.

A cable according to the invention may also have at least one communications element and one or more longitudinally extending strength members, each strength member having an extruded tubular jacket thereon made of a thermoplastic material having embedded therein reinforcement fibers each having a length of nor more than 0.20 cm. The reinforcement fibers constitute a maximum proportion by weight of the coating of twenty-five percent.

Addition of the reinforcement fibers preferably should reduce the coefficient of thermal expansion of the thermoplastic material of any reinforced tube by at least five percent, preferably by around ten percent or more.

BRIEF DESCRIPTION OF THE DRAWINGS

These and other features of the invention are best understood by referring to the detailed description of the invention, read in light of the accompanying drawings, in which.

DETAILED DESCRIPTION OF THE INVENTION

The present invention will now be described more fully hereinafter with reference to the accompanying drawings, in which one or more preferred embodiments of the invention are shown. This invention may, however, be embodied in many different forms and should not be construed as limited to the embodiments set forth herein; rather, these embodiments are provided so that the disclosure will fully convey the scope of the invention to those skilled in the art. Like numbers refer to like elements throughout. The drawings are not necessarily drawn to scale but are configured to clearly illustrate the invention.

Figure 1:
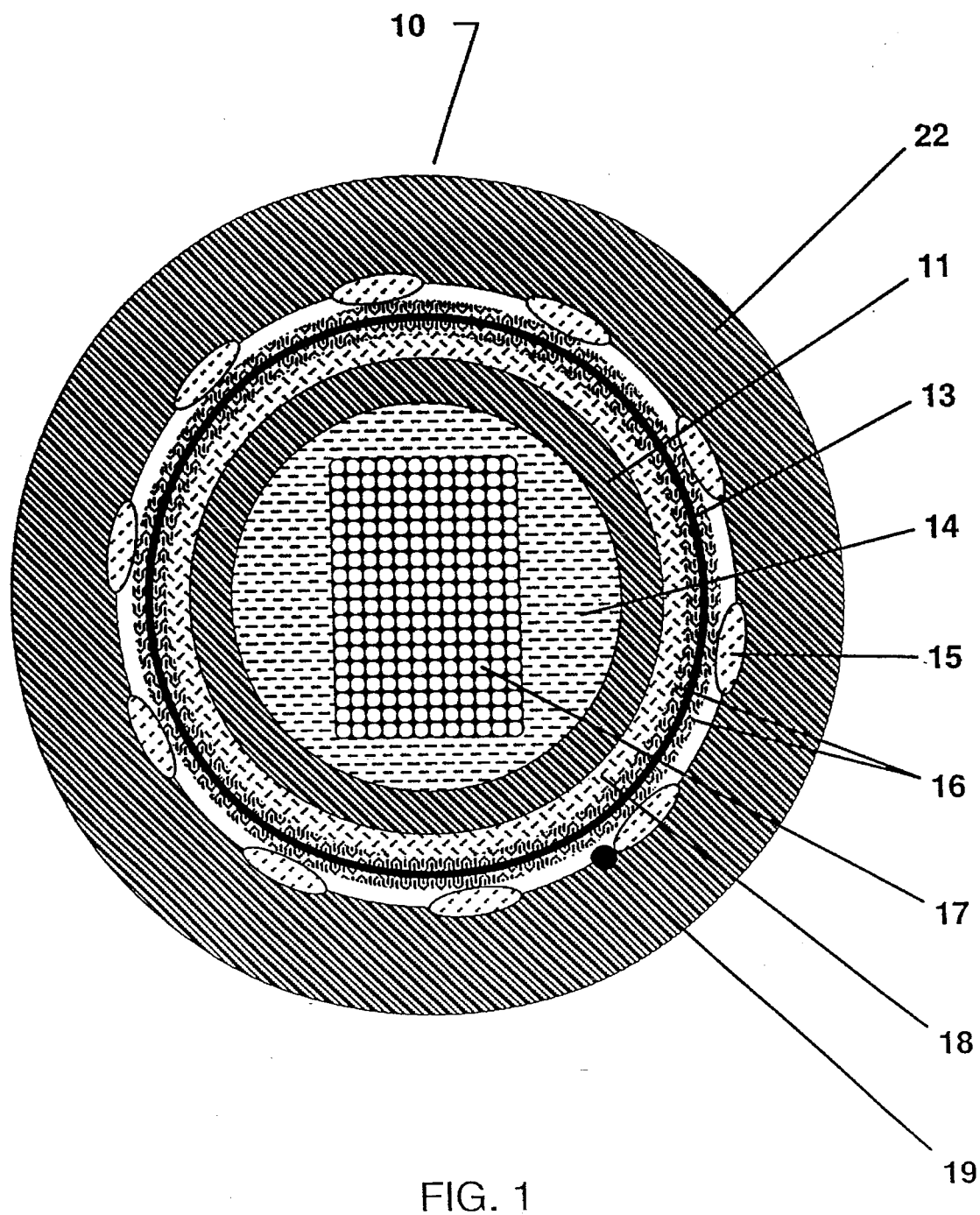
FIG. 1 a cross-sectional view of a cable according to the invention.

FIG. 1 depicts an optical fiber cable 10 comprising optical fibers 17 in a stack of ribbons, each ribbon coated with a matrix of ultraviolet light cured urethane acrylate material. The stack of ribbons and filling compound 14 are disposed in a polypropylene buffer tube 11 having a plurality of glass reinforcement fibers having a length of 0.04 cm embedded in the wall of tube 11. A layer 18 of tensile strength members such as aramid fibers are stranded around tube 11. Around layer 18 is a fire resistant tape 13 between layers 16 of water absorbent material. Surrounding tape 13 are antibuckling members 15 contacting outer polypropylene tubular jacket 22. Jacket 22 also has a plurality of glass reinforcement fibers having a length of 0.04 cm embedded in its wall. The respective glass fibers constitute a proportion of fifteen percent by weight of tubes 11 and 22.

Those of ordinary skill in the art will understand that cables having a wide variety of designs may incorporate cable elements made according to the teachings of this invention, and that the cable of FIG. 1 is only one example of such cables.

Figure 2:
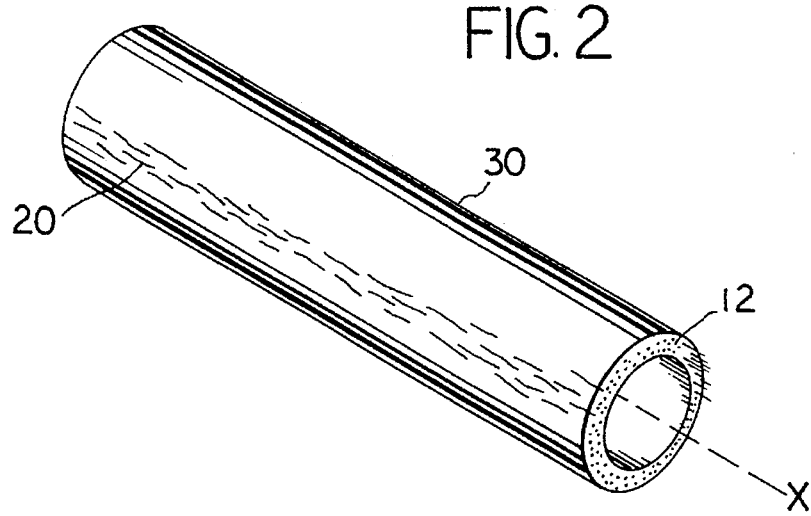
FIG. 2 is a partial perspective view of an inventive tube used in the cable; and, FIG. 3 is a cross sectional view of a cable according to a second embodiment.

FIG. 2 is a perspective view of a tube 30 according to the invention having a longitudinal axis x, which may be used as either of tubes 11 or 22 of FIG. 1. Reinforcement fibers 20 are oriented predominantly parallel to the longitudinal axis of the tube. Thermoplastic material 12 may be any of a variety of plastics, such as polyethylene, polypropylene, polyvinylchloride, polyamides, polyacetal, polybutylene terephthalate, or polyvinylidene fluoride or combinations thereof.

Figure 3:
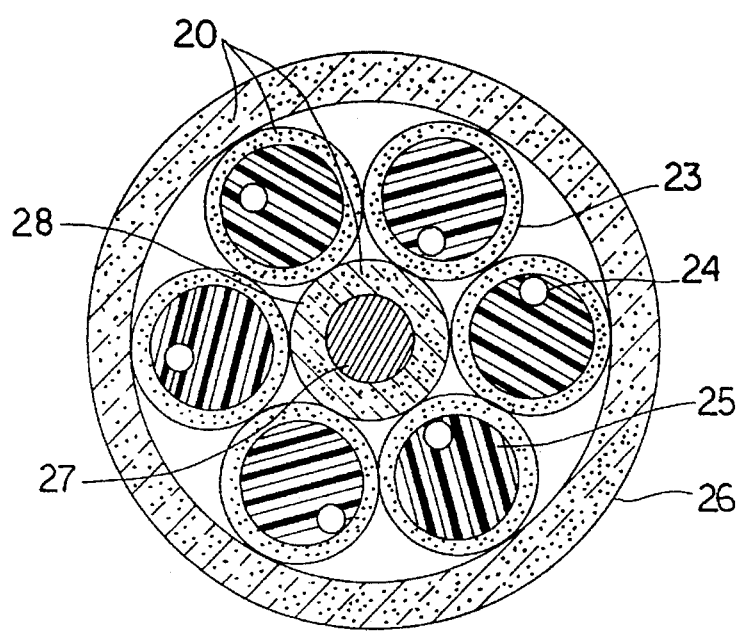

A cable may also utilize one or more strength members each coated by a tube made according to the invention. The cable of FIG. 3 includes an outer sheath 26, buffer tubes 23 holding optical fibers 24 and viscous filling compound 25, and a central strength member 27 coated by an extruded coating 28, with tubes 23, coating 28, and sheath 26 having the same composition as the filled plastic material used in the tube of FIG. 2. Adding reinforcement fibers to the plastic of coating 28 is useful to reduce the coefficient of thermal expansion of the coating 28. Coating 28 is made of polypropylene plastic material, coating 28 having a percentage by weight of 15 percent of glass fibers having a length of 0.08 cm.

The length of the fibers 20 is from around 0.02 cm to around 0.20 cm. A reinforcement fiber length of 0.10 cm or less may be used. The preferred material for the reinforcement fibers 20 is glass, but other materials having sufficient compressive strength such as aramid fibers, carbon fibers, boron fibers, or ceramic fibers may be used. Different thermoplastics exhibit different abilities to bond with the short reinforcement fibers, and the reinforcement fibers may have surfaces having differing chemical treatments to enhance such bonding. All such properties of the materials in the reinforced tubes should be considered.

The compressive and tensile strength of the reinforcement fibers and the bonding of the reinforcement fibers to the tube matrix material should be sufficient to substantially reduce the coefficient of thermal expansion of the tube incorporating the reinforcement fibers as compared to the coefficient of thermal expansion of the tube absent such reinforcement fibers. As used herein, such substantial reduction in the coefficient of thermal expansion is defined to be a reduction of at least five percent. In the case of a buffer tube, the reduction in post-extrusion shrinkage should also be substantial. A reduction of at least twenty percent in the percentage of tube longitudinal post-extrusion shrinkage after seven days is considered to be substantial. The maximum proportion by weight of the reinforcement fibers in the tube is twenty-five percent.

The desirable maximum proportion by weight of reinforcement fibers 20 in a tube was found to be dependent on the length of the reinforcement fibers, as shown in the tables below. In each case, the buffer tubes whose properties were measured and set out in the tables were made of Owens Corning 731 EC (1/32") or 737 BC (1/64") glass fibers embedded in Exxon Escorene 7292 N polypropylene thermoplastic material.

TABLE 1

Tube parameters
(Glass reinforcement fibers having a length of 1/64 inch
(= 0.04 cm))

| Percentage by weight of reinforcement fibers | % Longitudinal post-extrusion shrinkage after seven days | % Elongation to break | Diameter at Kink, mm | Coefficient of thermal expansion at 25° C., μm/m/°C. |
|---|---|---|---|---|
| 0 | 0.30 | 730 | 14.9 | 127.2 |
| 5 | 0.12 | 720 | 22.2 | 113.6 |
| 15 | 0.075 | 615 | 26.1 | 97.4 |
| 20 | 0.03 | 530 | 23.6 | 91.3 |
| 25 | 0.02 | 60 | 28.8 | 81.8 |
| 35 | 0.02 | 12 | 47.5 | 67.2 |

TABLE 2

Tube parameters
(Glass reinforcement fibers having a length of 1/32 inch
(= 0.08 cm))

| Percentage by weight of reinforcement fibers | % Longitudinal post-extrusion shrinkage after seven days | % Elongation to break | Diameter at kink, mm |
|---|---|---|---|
| 5 | 0.125 | 680 | 26.2 |
| 15 | 0.035 | 16 | 34.7 |
| 25 | 0.020 | 11 | 65.1 |

It is noted that for tubes comprising glass fibers having a length of 1/32 inch embedded in a different polypropylene material, with the glass fibers comprising fifteen percent by weight of the tube, the percentage elongation to break was found to be 580. The bonding of the plastic material to the reinforcement fibers was unsatisfactory.

The results demonstrate that a reduction in the length of the reinforcement fibers used may have a substantial impact on tube brittleness. For example, with tubes having fifteen percent by weight of reinforcement fibers, the tube percentage elongation to break for reinforcement fibers having a length of 0.08 cm is shown in Table 2 to be 16, which is considered unacceptable; whereas when the length of the reinforcement fibers used is reduced to 0.04 cm, the tube percentage elongation to break increases to 615, which is considered acceptable.

The maximum proportion by weight of the reinforcement fibers to be used in a tube according to the invention should be selected according to the length of the reinforcement fiber. The results show that longer fibers should be loaded in a smaller proportion by weight than shorter fibers. For example, in both Tables 1 and 2, a loading of reinforcement fibers of five percent by weight gives acceptable results; however, a loading of reinforcement fibers of fifteen percent by weight gives acceptable results in Table 1, but not in Table 2.

For a particular polypropylene material tested, if reinforcement fibers having a length from around 0.02 cm to around 0.06 cm are used, the maximum proportion by weight of the reinforcement fibers in their respective tubes is about 25%, while if reinforcement fibers having a length from around 0.06 cm to around 0.10 cm are used, the maximum proportion by weight of the reinforcement fibers is about 15%.

A minimum reinforcement fiber length and loading level is necessary to provide effective post-extrusion shrinkage control. A percentage by weight of five percent by weight of the reinforcement fibers gave acceptable results as shown in both Tables 1 and 2.

Acceptable results for tensile modulus, diameter at kink, lateral crush strength, and coefficient of thermal expansion were found for tubes made according to the invention.

Shod reinforcement fibers having a maximum length of 0.2 cm may also be embedded in the plastic tubes as described herein to minimize longitudinal dimensional changes.

Table 1 shows that the addition of five percent by weight of the glass reinforcement fibers resulted in around a ten percent reduction of the coefficient of thermal expansion of the tube, from 127.2 to 113.6 μm/m/° C. At least a five percent reduction is preferable. Table 1 also shows that the addition of five percent by weight of the glass reinforcement fibers resulted in a reduction of over fifty percent, from 0.30 to 0.12, in the percentage of tube longitudinal post-extrusion shrinkage as measured seven days following extrusion of the buffer tube.

A process for making reinforced thermoplastic material according to the invention is described as follows. The reinforcement fibers were mixed into the thermoplastic with as little breakage as possible. Polypropylene was melted in the back of a twin screw compounder at about 250° C. and then glass fibers were added, after a which a vacuum removed any gases. The extrudate exited in a stringlike form and was then water cooled, air dried, and chopped into pellets. Standard melt pressure and extruder load was not changed due to the presence of the glass in the pellets. The extrusion temperature was about 250° C. However, the extrusion temperature may be between 150° C. and 300° C., depending on the thermoplastic material used.

To form a cable tube, the pellets are then fed into an extruder. A normal processing line apparatus, including optical fiber payoffs, an extruder, a cooling trough, and a take-up reel or disc, may be used in constructing buffer tubes according to the invention, which may then be cabled in a separate processing line. However, a single line for forming both the buffer tube and an outer jacket may be used if desired for some cable constructions. A common extrusion crosshead will orient the reinforcement fibers predominantly along the longitudinal axis of the tube.

It is to be understood that the invention is not limited to the exact details of the construction, operation, exact materials, or embodiments shown and described, as modifications and equivalents will be apparent to one skilled in the art without departing from the scope of the invention.

What is claimed is:

1. A communications cable, comprising:

at least one communications element; and, an extruded tube containing said at least one communications element, said tube made of a thermoplastic material having embedded therein reinforcement fibers each having a length of not more than 0.10 cm, said reinforcement fibers constituting a maximum proportion by weight of the tube of twenty-five per cent.

2. A communications cable as set forth in claim 1, wherein the maximum proportion by weight in the tube of the reinforcement fibers and the length of the reinforcement fibers are selected as a function of the percent elongation to break of the tube incorporating the reinforcement fibers, such that the tube has a relatively high percent elongation to break.

3. A communications cable as set forth in claim 1, wherein the thermoplastic material consists of at least one of the group comprising polyethylene, polypropylene, polyvinylchloride, polyamide, polyacetal, polybutylene terephthalate, or polyvinylidene fluoride.

4. A communications cable as set forth in claim 1, wherein the tube having the reinforcement fibers embedded therein is the cable outer jacket.

5. A communications cable as set forth in claim 1, wherein the tube having the reinforcement fibers embedded therein is a buffer tube which has a reduction of at least twenty percent in the percentage of tube longitudinal post-extrusion shrinkage after seven days as compared with the percentage of tube longitudinal post-extrusion shrinkage after seven days of a tube having no reinforcement fibers incorporated in its plastic matrix material.

6. A communications cable as set forth in claim 1, wherein the tube having the reinforcement fibers embedded therein has a coefficient of thermal expansion which is at least five percent less than the coefficient of thermal expansion of the thermoplastic material without such reinforcement fibers.

7. A communications cable as set forth in claim 6, wherein the maximum proportion by weight in the tube of the reinforcement fibers and the length of the reinforcement fibers are selected as a function of the percent elongation to break of the tube incorporating the reinforcement fibers, such that the tube has a relatively high percent elongation to break.

8. A communications cable as set forth in claim 6, wherein the tube having the reinforcement fibers embedded therein is the cable outer jacket.

9. A communications cable, comprising:

at least one communications element; and, an extruded tube containing said at least one communications element, said tube made of a thermoplastic material having embedded therein reinforcement fibers each having a length of not more than 0.20 cm, said reinforcement fibers constituting a maximum proportion by weight of the tube of twenty-five per cent.

10. A communications cable as set forth in claim 9, wherein the thermoplastic material consists of at least one of the group comprising polyethylene, polypropylene, polyvinylchloride, polyamide, polyacetal, polybutylene terephthalate, or polyvinylidene fluoride.

11. A communications cable as set forth in claim 9, wherein the tube having the reinforcement fibers embedded therein is the cable outer jacket.

12. A communications cable as set forth in claim 9, wherein the tube having the reinforcement fibers embedded therein has a coefficient of thermal expansion which is at least five percent less than the coefficient of thermal expansion of the thermoplastic material without such reinforcement fibers.

13. A communications cable as set forth in claim 12, wherein the tube having the reinforcement fibers embedded therein is the cable outer jacket.

14. A communications cable, comprising:

at least one communications element;

a longitudinally extending strength member; and, an extruded coating on said at least one strength member, said coating made of a thermoplastic material having embedded therein reinforcement fibers each having a length of not more than 0.10 cm, said reinforcement fibers constituting a maximum proportion by weight of the coating of twenty-five per cent.

15. A communications cable as set forth in claim 14, wherein the thermoplastic material consists of at least one of the group comprising polyethylene, polypropylene, polyvinylchloride, polyamide, polyacetal, polybutylene terephthalate, or polyvinylidene fluoride.

16. A communications cable as set forth in claim 14, wherein the coating having the reinforcement fibers embedded therein has a coefficient of thermal expansion which is at least five percent less than the coefficient of thermal expansion of the thermoplastic material without such reinforcement fibers.

17. A communications cable, comprising:

at least one communications element;

a longitudinally extending strength member; and, an extruded coating on said at least one strength member, said coating made of a thermoplastic material having embedded therein reinforcement fibers each having a length of not more than 0.20 cm, said reinforcement fibers constituting a maximum proportion by weight of the coating of twenty-five per cent.

18. A communications cable as set forth in claim 17, wherein the coating having the reinforcement fibers embedded therein has a coefficient of thermal expansion which is at least five percent less than the coefficient of thermal expansion of the thermoplastic material without such reinforcement fibers.

19. A communications cable as set forth in claim 17, wherein the thermoplastic material consists of at least one of the group comprising polyethylene, polypropylene, polyvinylchloride, polyamide, polyacetal, polybutylene terephthalate, or polyvinylidene fluoride.

* * * * *